INVENTOR.
ALBERT R. UHLIG.

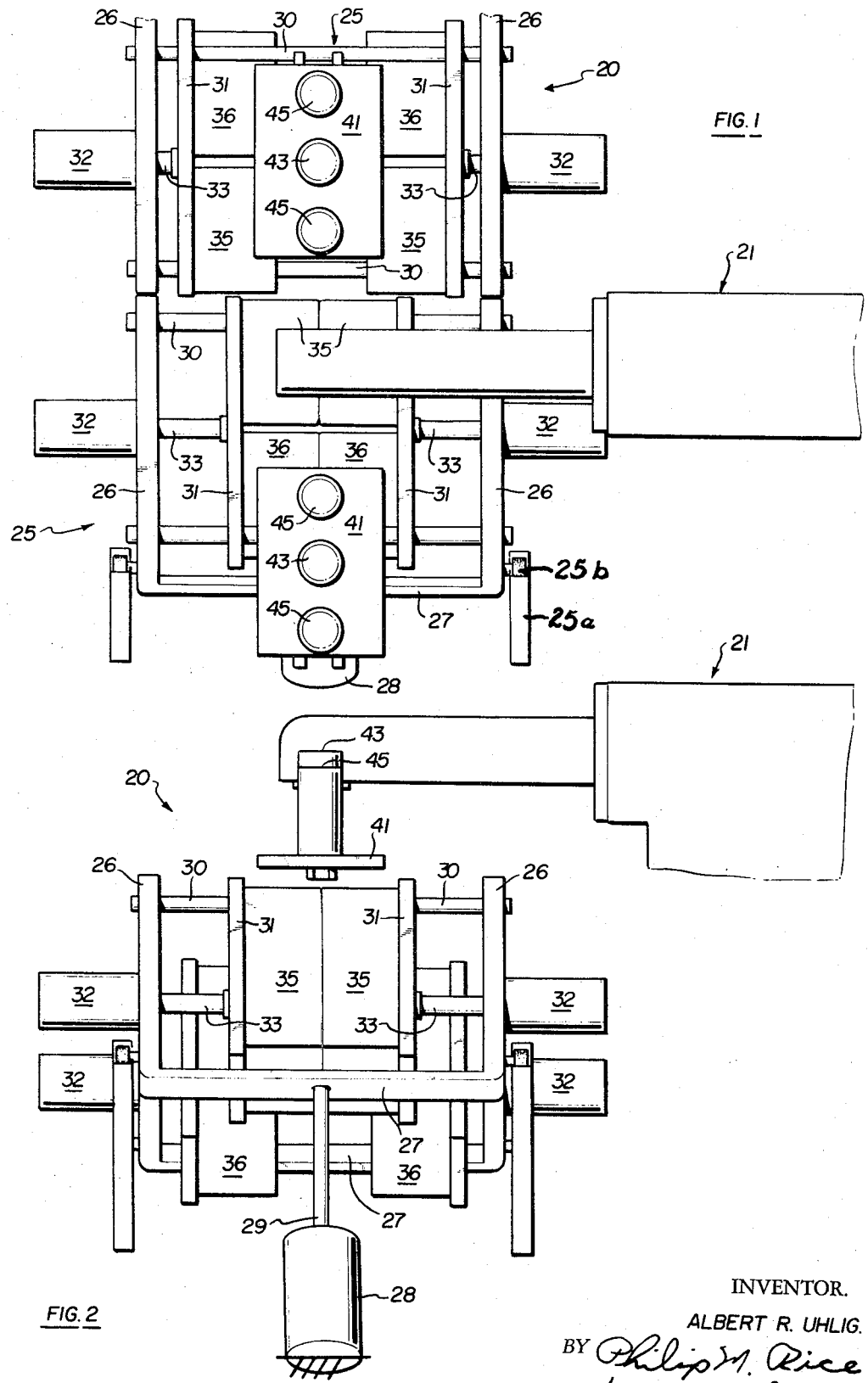

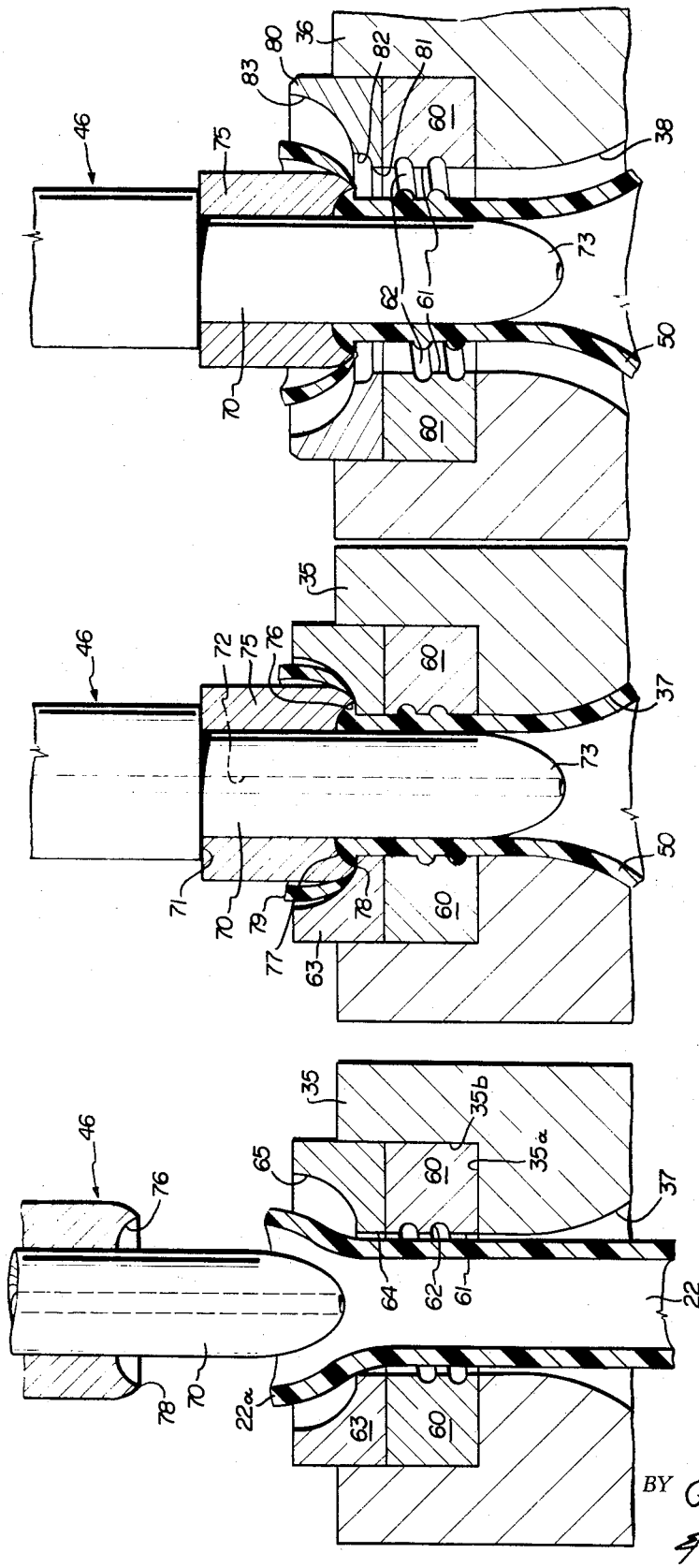

3,767,747
METHOD FOR BLOW MOLDING
Albert R. Uhlig, Toledo, Ohio, assignor to
Owens-Illinois, Inc.
Filed Jan. 4, 1971, Ser. No. 103,624
Int. Cl. B29c 17/07
U.S. Cl. 264—89                                                                              7 Claims

ABSTRACT OF THE DISCLOSURE

An improved method for forming blow molded articles of enhanced physical characteristics by orienting the material during the formation of the article. A two-stage blowing operation is provided wherein a pre-form blow mold effects a uniform and controllable transfer of heat from a freely extruded tube. The pre-form is conditioned, both thermally and dimensionally, within the pre-form for most effective orientation during a subsequent final blowing operation.

Manipulatively, the disclosed method provides a completely overlapped pre-blowing and final blowing operation, and more than one set of pre-blow and final blow molds may be utilized at a single extruder orifice, if desired. Further, the direction and extent of movement of the molds adapts the method to presently existing blow molding machines, while increasing the machine output.

Successively utilized blow tubes form and reform the open or blowing end of the tube to a final configuration. In the manufacture of containers, the two successively utilized blow tubes form an accurate, dimensionally stable finish for a bottle while also severing any neck flash from the finish.

BACKGROUND OF THE INVENTION

The prior art contains several examples of attempts to utilize the phenomenon of bi-axial orientation in thermal plastic material for the blow molding or various articles. For example, U.S. Pat. Nos. 3,311,684; 3,470,282; 2,919,462, and 3,337,666 provide various blow molding arrangements. Generally, the prior art processes attempt to cool a parison to a uniform orientation temperature, stretch the parison and then blow the stretched parison into a container. Alternatively, other proposals involve the injection molding of a parison, the cooling and the reheating of the injection molded parison, and the blowing of the reheated parison to its final configuration.

Such processes are ill adapted to high production rates, and such processes are not adaptable to conventional, free extrusion blow molding machines now in use in many blow molding operations.

In view of the very substantial advantages residing in blow molding under conditions conducive to bi-axial orientation, there does exist a need for a practical, rapid, efficient blow molding method which is adaptable to the over-all free extrusion blow molding technique. If it were possible, at the same time, to eliminate extraneous flash from the article, e.g. at the neck, handle and bottom portions of a bottle, a long standing need in the art would be satisfied.

BRIEF DESCRIPTION OF THE PRESENT INVENTION

The present invention now proposes a blow molding method which is particularly adapted for utilization with the so-called "free-extrusion" blow molding machines wherein a pendant tube of thermoplastic material is issued from a downwardly facing orifice. This is probably the simplest form of blow molding machine, and such machines are in wide usage.

In essence, this invention forms a plastic article, such as a bottle or the like, by the performance of two successive blowing operations upon a section of such a freely extruded pendant tube. The blow molds are shiftable into and out of registry with the tube, preferably in a linear path which is inclined so as to include both horizontal and vertical components of movement. This same type of linear, inclined movement has been earlier utilized in known blow molding machines, for example, in machines manufactured and sold by Bekum Maschinen-Vertrief of Berlin, Germany. Of course, other mold movements, either linear or rotary, can be utilized, but the herein disclosed specific inclined movement is preferred for adaption to known machines of the "Bekum" type.

The shiftable blow molds include openable and closable blow mold sections which move transversely of their path of linear, inclined movement, and such blow molds are provided in pairs. One mold of the pair of blow molds is a pre-form mold having an interior body-defining blow cavity which corresponds generally to the shape of the final article, but of substantially smaller dimensions. In the manufacture of a bottle, the bottle neck in the pre-form mold is an exact duplicate of the final non-blown bottle neck. The second mold of the pair of blow molds has an interior cavity which conforms exactly to the size and shape of both the body and the neck of the finished article.

In operation, the pre-form mold is closed on the pendant tube hanging from the extrusion orifice, the closure of the pre-form mold pinching the tube shut to form a blowable bubble or parison. The tube entrapped in the pre-form mold is then moved with the mold laterally and vertically away from the location of the extruded tube, and a first blow tube is inserted into the portion of the tube protruding from the pre-form mold. Insertion of the first blow tube compression molds the neck of the container and air under pressure is introduced into the parison to inflate the same to the configuration of the pre-form mold. During blowing of the pre-form and during the residence time of the pre-form in the pre-form mold, the pre-form is being cooled.

After the desired amount of cooling has been accomplished in the pre-form mold, the pre-form mold is opened, and the pre-form is retained in position on the first or pre-form blow tube. The open pre-form mold is then shifted into alignment with the next successive tubular extrusion at the extrusion orifice, leaving the pre-form on the blow tube. The final blow mold is then closed on the pre-form, the first blow tube is retracted and the pre-form is retained interiorly of the blow mold. The blow mold, with the entrapped pre-form, is then moved into alignment with a final blow tube which is inserted into the pre-form. Air under pressure through the final blow tube inflates the pre-form to the exact shape of the final article.

The amount of cooling of the plastic material during the extrusion of the tube, the time of retention of the plastic material in the pre-form mold and the time of transfer of the pre-form to the final blow mold for blowing is all carefully correlated with the wall thickness of the pre-form and of the final article and with the material utilized in the operation, so that the final blowing is accomplished under conditions most conducive to orientation. Such conditions exist when the average wall temperature of the pre-form at the time of blowing is at a temperature within the range defined from the crystalline melting point of the material plus 20° F. to the crystalline freezing point of the material minus 20° F. At these temperatures, the maximum orientation of the material is developed and the full benefits of bi-axial orientation during blowing are obtained. Further, the size and shape of the pre-form is carefully correlated with these characteristics of the final article. Preferably, the shape of the pre-form is such that the side walls of the pre-form will all be expanded to substantially the same extent during the final blowing operation, so that the walls are bi-axially oriented to a uniform degree. In this manner, thick and thin spots in the side walls are avoided, and the occurrence of non-oriented or over-oriented localized areas is avoided. Of course, variation can be made to provide thickened portions in the walls or other portions of the article, less orientation in selected areas, etc.

The present invention also contemplates a specific process for forming and then reforming those portions of the article which are contacted by the blow tube for both the pre-form and the final article. By utilizing the herein suggested method in connection with the specific blow pipe arrangement, one can form a container or the like which is free of neck flash, thus eliminating a subsequent post-blowing operation.

Similarly, that portion of the extruded tube which is pinched shut in the pre-form mold normally forms bottom flash on the container. By removing the bottom flash after the pre-form is blown to shape, this flash does not interfere with the subsequent final blowing operation and the final article is free of bottom flash.

Generally, the present invention provides for the pre-form molds and the blow molds to be jointly displaceable relative to the extrusion orifice, with the pre-form sections being openable and closable jointly with the final mold sections. This arrangement not only simplifies the mold actuating mechanism, it also insures accurate registry of the blow molds with their respective blow tubes and accurate registry of the compression molded portions of the container with the appropriate portions of the blow mold sections, and a completely overlapped, efficient molding operation is obtained.

In effect, the method of the present invention subdivides the blowing and cooling of the extruded tube into two successive blowing and cooling operations. This means that the residence time of the tube in the blow mold is reduced by one-half, and by accurately overlapping the two blowing and cooling operations, the cycle time is reduced by approximately 50%. Further, it is possible to utilize multiple sets of molds, each set including a pre-form mold and a final blow mold. By alternately advancing the pre-form molds of two such sets of molds into alignment with the extrusion orifice, the production capacity of a blow molding machine can again be doubled.

It is, therefore, an important object of the present invention to provide an improved method of blow molding articles from a tube depending from an extrusion orifice by enclosing and blowing the tube in a pre-form mold, and transferring the blown pre-form to a final blow mold wherein the article is blown to its final configuration under conditions conducive to bi-axial orientation of the material constituting the article.

Another important object of this invention is the provision of a method for blow molding articles from a tubular parison and including consecutively utilized pre-form and final blow molds, and individual blow tubes for the tube molds to aid in transferring the blown pre-form to the final blow mold and to provide a flash-free opening in the blow molded article.

It is a further important object of this invention to provide a method of making blown articles wherein a parison of thermal plastic material is blown into a pre-form of generally the same configuration as the final article, but of substantially less size, and the final article is blown from the pre-form as the pre-form walls are at a temperature ranging from the crystalline melting point of the material plus 20° F. to the crystalline freezing point of the material less 20° F.

Yet another, and no less important, object of this invention is the provision of a process for the manufacture of blown thermal plastic articles wherein a freely extruded tube is formed into a blowable parison interiorly of a pre-form mold, a blow tube is inserted into the parison and the parison is blown to its pre-formed shape, following which the pre-form is transferred on its blow tube to a blow mold cavity of larger size than the pre-form but of substantially the same shape, and the pre-form is blown interiorly of the blow mold to the final configuration of the article while the pre-form walls are at an average temperature most conducive to bi-axial orientation.

Other and further objects of the present invention will become apparent from the following description.

AS SHOWN IN THE DRAWINGS

FIG. 1 is a plan view of a blow molding machine of the present invention capable of carrying out the method of the present invention;

FIG. 2 is a side elevational view of the apparatus shown in FIG. 1;

Figures 3, 4:
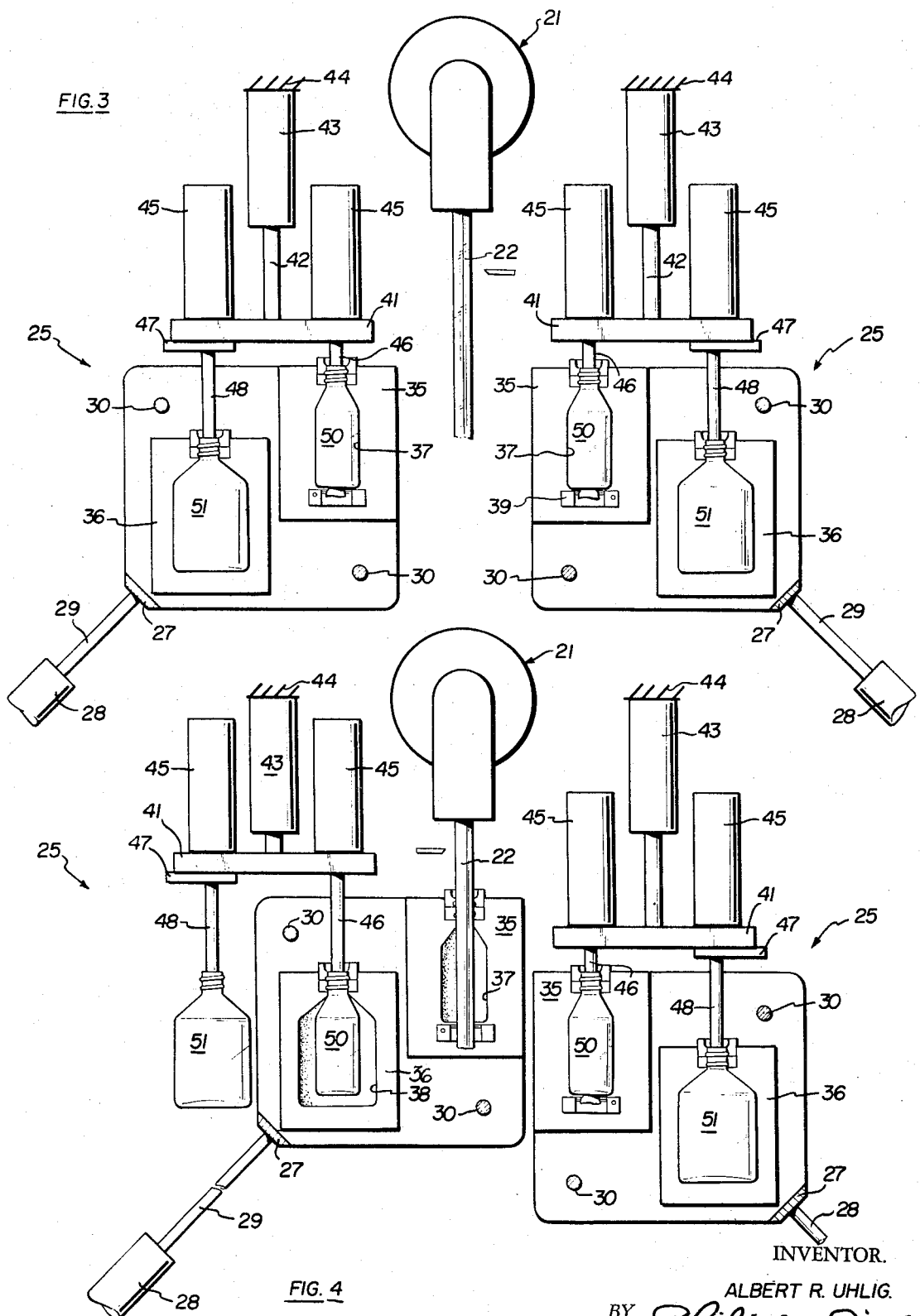
FIG. 3 is a front elevational view, with parts broken away and in section, of the apparatus of FIGS. 1 and 2 and showing one adjusted position of the apparatus and one step of the method.
FIG. 4 is a view similar to FIG. 3 showing a different adjusted position of the apparatus and a second step of the method.
Figure 5:
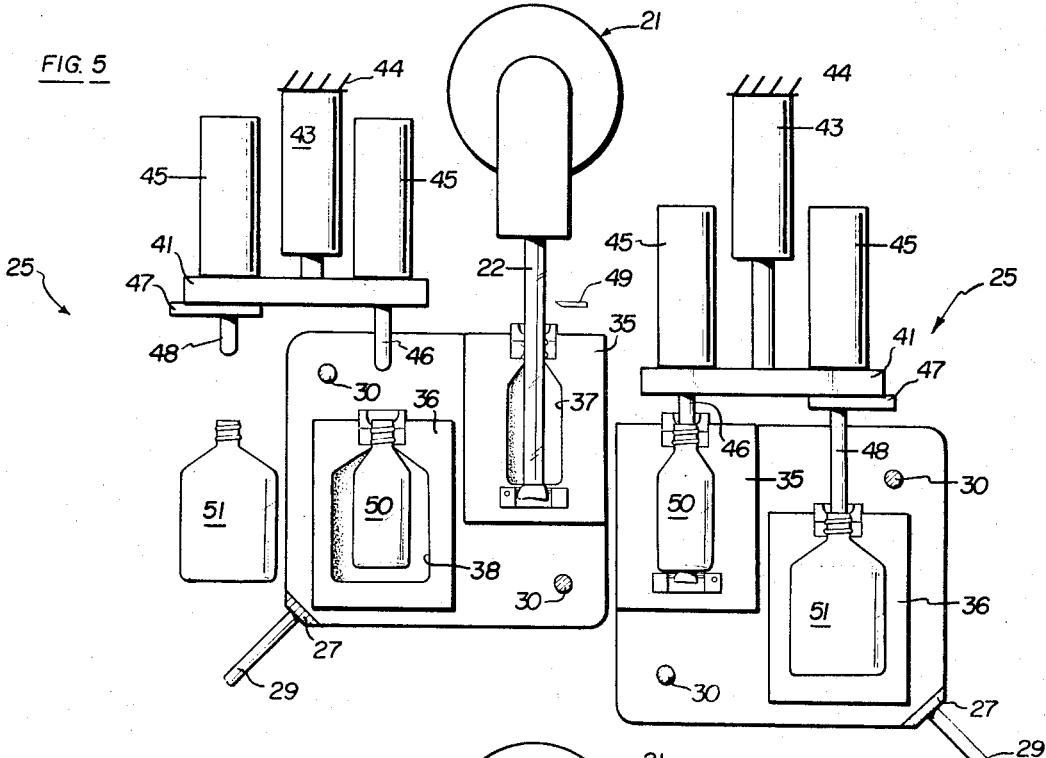
FIG. 5 is a view similar to FIGS. 3 and 4 and illustrating a different adjusted position of the apparatus and a third step of the method.
Figure 6:
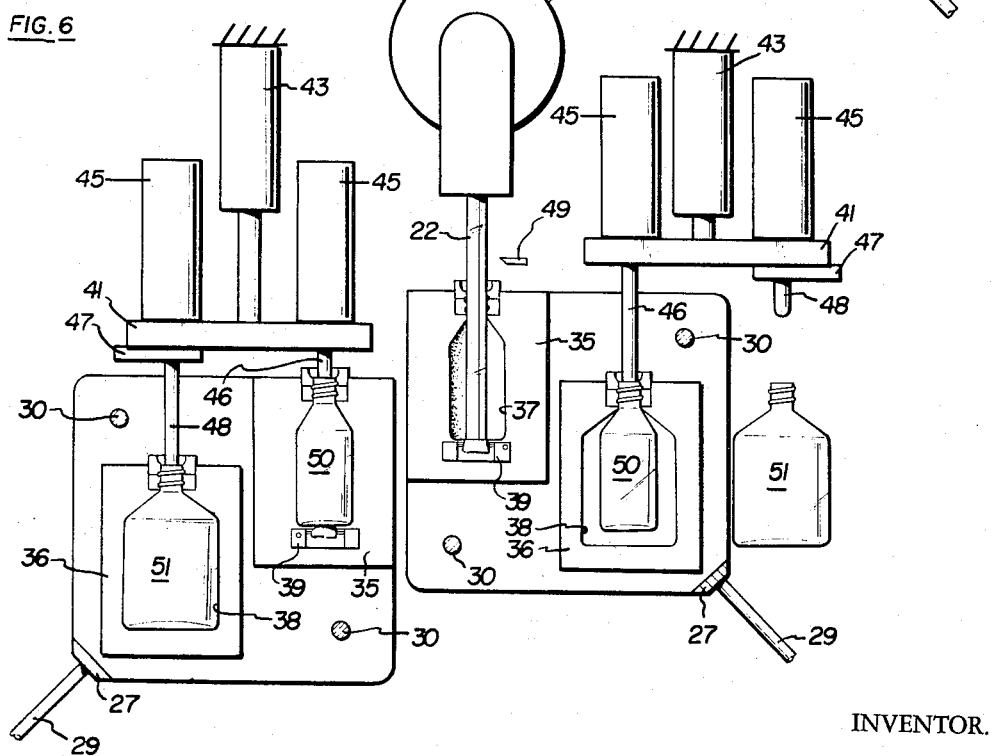

FIG. 6 is a view similar to FIGS. 3 through 5 and showing yet another adjusted position of the apparatus, and a fourth step of the method; and FIGS. 7 through 12 are fragmentary, enlarged sectional views, with parts shown in elevation, of the blow tube and mold arrangement of the present invention and capable of forming and reforming a portion of an article made in the apparatus of FIGS. 1 through 6.

DESCRIPTION OF THE PREFERRED EMBODIMENTS

As illustrated in FIGS. 1 through 6, reference numeral 20 refers generally to a blow molding apparatus of the present invention. This blow molding apparatus 20 includes a conventional screw-type extruder with the necessary drive mechanism associated therewith, the extruder mechanism being generally indicated by reference numeral 21 and being capable of issuing a pendant tube 22 therefrom.

Positioned generally below and laterally to either side of the pendant tube 22 are blow mold assemblies indicated generally at 25. For purposes of illustration, these blow mold assemblies 25 are indicated schematically as comprising a pair of relatively massive side support plates 26 joined by transverse bar 27 to be moved in unison toward and away from the vertical plane of the pendant tube 22 by actuating cylinders 28, the cylinders having their piston rods 29 connected to the bars 27. This will be readily apparent from a comparison of FIGS. 3, 4, 5 and 6. The cylinders 28 move the mold assemblies 25 in an inclined path having both vertical and horizontal components relative to the location of the extruder 21. The inclined paths of the mold assemblies 25 are defined by similarly inclined fixed guide tracks 25a receiving rollers 25b carried by the side plates 26, respectively.

The massive side plates 26 each carry a transversely extending guide rod 30 which is fixed to the plates and which serves to carry mold support plates 31 transversely movable toward and away from one another between the fixed side plates 26. Such transverse motion is effected by mold actuating cylinders 32 mounted on each of the side plates and having their piston rods projecting through the side plates and attached to the mold plates 31. Of course, other actuating means for the plates 31 may be utilized, such as a single cylinder 32 and an equalizing chain, etc.

Mounted on the mold plates 31 for displacement therewith are separate pairs of pre-blow mold sections 35 and blow mold sections 36. It will be appreciated that pre-blow molds 35 and the blow molds 36 are provided in matched pairs and that one set of pre-blow mold sections 35 and one set of blow mold sections 36 are opened and closed in unison by the appropriate cylinders 32.

As schematically represented in FIGS. 3 through 6, each set of the pre-blow molds cooperate to define an interior pre-blow cavity 37, while each set of the blow molds 36 cooperate to define an interior final mold cavity 38 which conforms in all particulars to the final shape of the article being blown. In the illustrated embodiment of the invention, the blown article is a bottle and the blow mold cavity 38 accurately defines the body and neck or finish of the bottle. The pre-blow mold cavity 37 has a neck or finish portion (hereafter described in detail) which conforms to the neck of the finished article, but the body portion or the blow portion of the pre-blow mold cavity 37 is substantially smaller than (1) the body portion of the blow mold cavity and (2) the body section of the blown and finished bottle. Additionally, the pre-blow mold 35 is provided with a pair of pivoted inserts, schematically shown at 39, which engage the bottom waste or "tail" portion of the blown pre-form and which are pivotally moved relative to the remainder of the pre-blow mold following the pre-blowing of the parison to remove the "tail," as is well known in the prior art.

Generally overlying each set of molds (comprising a pre-blow mold 35 and a blow mold 36) is a blow tube arrangement indicated generally and schematically at 40. Each such blow tube arrangement comprises the support plate 41 mounted at the lower end of an actuating rod 42 forming a part of an actuating cylinder 43 fixed to an overhead support, as schematically indicated at 44. Superimposed on the support plate 40 is a pair of blow tube actuating cylinders 45 from each of which depends a blow tube 46, 48, the blow tubes extending through the plate 41 and being connected to a supply of blow air under pressure. Mounted on the underside of the support plate 41 and adjacent the blow tube 48 for each of the blow molds 36 is a stripper plate 47.

As thus described and as schematically illustrated in FIGS. 1 through 6, the apparatus of the present invention is quite similar to free extrusion blow molding machines manufactured by Bekum Maschinen-Vertrieb under the classification "Bekum 120." The Bekum 120 machine does not utilize a pre-blow machine or a pre-blow mold such as the mold 35, but rather the Bekum machine utilizes one or more identical blow molds, such as the molds 36. Further, the blow tubes 46 in the Bekum machine are not individually and independently actuated, but rather are simultaneously actuated for blowing.

In other words, in the conventional Bekum machine, the pendant freely extruded tube is simply enclosed within a blow mold, a blow tube is inserted into the tube and the tube is blown interiorly of the single blow mold. Further, if more than one article is to be blown at a time with the Bekum machine, more than one tube 22 must be extruded. However, the actuating arrangement for the molds including the actuating cylinders 28 and the diagonal path of movement of the mold carriage comprising the support plates 26 and the bar 27 of the present invention are generally similar to those of the Bekum machine.

Turning now to the operation of the over-all machine illustrated in FIGS. 3 through 6, it will be seen from FIG. 3 that both of the sets of molds 35 and 36 have been moved from the extrusion location and a pendant tube 22 for the next blowing operation is being extruded from the extruder 21.

Next, the left hand molds 35 and 36 are opened by actuation of their cylinders 32 and the mold carrying side plates 26 and the molds are then moved diagonally upward and to the right to the position illustrated in FIG. 4 of the drawings. To accommodate such movement of the mold assembly, the corresponding cylinder 43 is actuated to retract the support plate 41 and the blow tubes 46, 48 upwardly. Of course, opening of the mold sections 35 and 36 suspends the previously blown pre-form 50 and the final blown article 51 intermediate the opened mold sections with the blown pre-form 50 and the blown article 51 remaining on their corresponding blow tubes 46, 48. Upward retraction of the cylinder 43 moves the blow tube assembly out of the path of movement of the blow molds.

The mold assembly 25 moves to the right to an extent such that the cavity 37 of the pre-blow mold 35 is aligned vertically with the pendant tube 22. Further, the movement of the blow mold assembly 25 to the right aligns the pre-blown shape 50 with the blow mold cavity 38, the cylinder 45 for the blow tube 46 being actuated to adjust the height of the pre-blown shape 50 properly with respect to the height of the cavity 38. The completely blown article 51 is positioned exteriorly of the blow mold assembly 25.

Summarizing the operations performed in the transition from FIG. 3 to FIG. 4 of the drawings, it will be seen that the following steps are carried out: (1) Blow mold assembly 25 is opened by cylinders to separate the mold sections defining the pre-form cavity 37 and the blow mold cavity 38; (2) Cylinder 43 is actuated to move the blow tube support plate 41 out of the path of movement of the blow molds 25; (3) The pre-blown shape 50 and the blown shape 51 are retained on the blow tubes 46, 48; (4) As the blow mold assembly 25 is shifted to the right and upwardly by actuation of cylinder 28 to align the pre-blow cavity 37 with the extruded tube 22; (5) The same shifting motion moves the blow mold cavity 36 into alignment with the pre-blown shape 50 still retained upon its blow tube 46; and (6) The fully blown shape 51 is disposed exteriorly of the blow mold assembly 25 on its blow tube 48 in vertical alignment with the stripper 47.

Next, transition is made from that adjusted position of the apparatus of FIG. 4 to that adjusted position illustrated in FIG. 5 of the drawings. To carry out this transition, the pre-blow mold sections 35 are closed on the pendant tube 22 and the blow mold sections 36 are closed on the pre-blown shape 50. This step is carried out by actuation of the cylinders 32. Next, the blow tubes 46, 48 are both retracted upwardly. Retraction of the right hand blow tube 46 withdraws the blow tube from the shape 50, leaving the pre-blown shape 50 suspended freely within the blow cavity 38. The retraction of the left hand blow tube 48 from the finally blown article 51 contacts the bottle neck or finish portion of the article 51 with the stripper plate 47 and allows the finished article 51 to fall from the molding appaartus. Of course, the closure of the pre-blow mold sections 35 on the tube 22 pinches the lower open end of the tube 22 between the pivoted "tail"— removing plates 39. This closure of the open end of the tube makes a blowable parison shape which can be subsequently inflated at the next stage of the operation. After the closing of the pre-blow mold sections 35 on the tube 22, the tube knife 49 severs the tube above the closed pre-form mold sections.

In the next stage of the operation, the blow assembly 25 is moved to the left by retraction of the piston rod 29 upon actuation of the cylinder 28, the closed mold sections 35 carrying with them the pinched, blowable tube therebetween and the closed blow mold sections 36 retaining therein the pre-blown section 50. When the position of FIG. 6 has been attained, the cylinder 43 is actuated to lower the blow tube plate 41, and the individual blow tubes 46, 48 are lowered by the cylinders 45 for insertion into the cut, blowable tube in the pre-blow mold sections 35 and into the pre-blow shape 50 in the blow molds, respectively. Next, blow air is passed through the blow tubes 46 to blow the tube and the pre-mold to the configurations illustrated in FIG. 6. The cycle is then repeated.

Thus, it will be apparent that the utilization of the two sets of molds (i.e. a left hand set consisting of the pre-blow mold 35 and the blow mold 36 and a right hand set consisting of a second pre-blow mold 35 and a second blow mold 36) results in a completely overlapped operation wherein substantially continuous operation is insured and maximum utilization of the capability of the extruder 21 to dispense the pendant tube 22 is obtained. Equally important is the fact that the utilization of consecutive preblowing and blowing operations reduces the cycle time by one-half.

The pre-blow operation, of course, extracts heat from the extruded tube which is pinched shut within the pre-blow mold. This means that less heat must be extracted in the final blow mold, and the cooling of the extrudable in two stages cuts the over-all residence time in the final blow mold to about one-half of that required in a single stage blow molding operation.

However, the greatest advantage of the present invention lies in the fact that it is now possible to blow mold at a temperature which is most conducive to bi-axial orientation of the material being molded. The theory and advantages of bi-axial oriented molded plastic articles is well known by this time. The substantial increases in strength, the avoidance of localized weakened portions in the molded article, and the more efficient utilization of the material constituting the article have been well established.

It has been found that the most efficient orientation of material in a blow molding operation occurs where the material is stretched by blowing while the material is at that average wall temperature (i.e. temperature throughout the thickness of the wall) which is most conducive to orientation. The average wall temperature for each essentially crystalline polymer lies intermediate the crystalline melting point of the material plus 20° F. and the crystalline freezing point of the material less 20° F. With respect to essentially amorphous polymer, such as polyvinyl chloride and polystyrene, the glass transition temperature is utilized, rather than crystalline melting and freezing temperatures. For high density polyethylene (having a density lying between 0.954 and 0.970) it is preferable to operate at a temperature of 250° F. plus or minus 20° F. For polyvinyl chloride and polystyrene the ideal orienting temperature is 205° F. plus or minus 25° F. For polypropylene, the ideal temperature is 310° F. plus or minus 30° F.

The present invention makes possible the utilization of this phenomenon by initially only partially expanding the parison within the pre-blow mold to initially cool the article to a temperature within 20° F. above its crystalline melting point and 20° F. below its crystalline freezing point and then blowing the article to its final configuration while it is within the above recited temperature range and while the maximum degree of orientation can be obtained. Of course, the only temperature which is important is the temperature at the time which it is actually blown to its final configuration in the final blow mold. The rheological history of the pre-blown shape is of no substantial importance, but the attainment of a temperature related to the melting point and freezing point as above defined at the exact moment of blowing is important. Thus, all of the cooling which takes place during extrusion of the tube, enclosure of the tube within the pre-blow mold, the pre-blowing, the transfer to the final blow mold and the residence time in the final blow mold prior to blowing are all calculated to yield the pre-blown shape at the moment of blowing at an average wall temperature at which orientation can be best carried out and the greatest strength obtained in the blown container obtained.

Further, by correlating the shape of the pre-blown intermediate with the shape of the final blown article, it is possible to uniformly orient all portions of the bottle, so that all portions of the bottle become uniformly stretched and uniformly oriented during the final blowing operation within the critical temperature range. Thus, the shape of the pre-form will vary with the shape of the final bottle. This factor in and of itself introduces a new element of flexibility into the designing of blow molded plastic bottles capable of exhibiting the maximum physical characteristics for the material being blown. In other words, by using the pre-blow technique, of this invention, one can obtain uniform orientation and uniformly high physical properties in bottles of complex shape and of widely varying cross sectional dimensions.

Turning now to FIGS. 7 through 12, there is illustrated in greater detail a preferred neck-forming apparatus for utilization with the over-all forming apparatus illustrated in FIGS. 1 through 6. While the apparatus of FIGS. 1 through 6 can be utilized for blow molding of any desired article, the mechanism and the method of the present invention are particularly adapted to the formation of bottles, jugs, or the like provided with a "finish" or neck having exterior threads and an accurately formed pouring lip. That portion of the apparatus illustrated in FIGS. 7 through 12 is particularly adapted to the formation of this type of finish and this type of pour lip.

As inidicated generally on FIGS. 3 through 6 and specifically in FIGS. 7 and 8, the pre-form mold sections 35 are provided with sectional, semi-cylindrical finish inserts 60 which are seated in recesses formed at the upper confronting portions of the pre-form molds 35. These recesses are provided by horizontal ledge surfaces 35a which are semi-circular in shape and by vertical surfaces 35b which are semi-cylindrical in shape. The semi-cylindrical inserts 60 are retained in place by conventional means (not shown). The interior surfaces of the insert 60 defines a complete cylindrical wall 61 provided with radially outwardly extending recesses 62 conforming to the threads to be formed on the neck or finish of the container.

Superimposed on the finish inserts 60 are striker inserts 63 which are generally semi-cylindrical in configuration and which have interior surfaces 64 forming continuations of the surfaces 62 and upwardly opening, radially enlarged recesses 65 for a purpose to be hereafter more fully described. The blow tube 46 which cooperates with the finish insert 60 to form the bottle finish is provided with a reduced diameter, lower extremity 70 joined to the blow tube 46 through a radially outwardly extending shoulder 71 (FIG. 8). The blow tube 46 and the lower end 70 thereof serves to define an interior air passage 72 open at its lower end onto a smoothly rounded lower extremity 73.

Surrounding the reduced lower end 70 of the blow pipe 46 and seated against the shoulder 71 is a forming sleeve 75 which is telescopic into the recess 65 of the striker block 63. This sleeve 75 is provided with a lower arcuate recess 76 terminating in a sharpened cutting edge 78.

In operation, and by a comparison of FIGS. 7 and 8, it will be seen that the tube 22 as extruded has an outside diameter slightly smaller than the outside diameter of the finish, which outside diameter is determined by the combined diameter of the semi-cylindrical surfaces 61 of the finish inserts 60. Further, the tube, as extruded and cut has a flared open upper end 22a into which the lower extremity 70 of the blow tube 46 is inserted. To facilitate entry of the blow tube into the extruded tube 22, blow air may be emitted from the blow tube as it is lowered into the tube 22 to retain the end 22a open.

The blow tube 46, of course, is lowered into the blow tube 22 by the cylinder 45 only after the extruded tube 22 has been entrapped within the pre-form mold 35 and pinched shut by the mold inserts 39, and then only after the pre-form mold sections 35 have been moved to their position of FIG. 3 by retraction of the cylinders 28. Thus, when the blow tube extension 70 is lowered into the extruded tube 22, the tube is expanded radially by the extension 70 which has an exterior diameter larger than the interior diameter of the tube. The entry of the extension 70 into the tube thus compression molds the finish of the container. Contact of the sleeve 75 with the flared open upper end 22a of the tube will shape a portion of the tube forced into the recess 76 to a convex or "crowned" configuration, indicated by reference numeral 77. The tube 22 is engaged outwardly of this convex portion 77 by the severing edge 78 of the sleeve 75 to substantially completely sever the flared waste or end portion 79 of the tube from the blown and compression formed remainder of the tube.

Thus, at the conclusion of the steps illustrated in FIGS. 7 and 8 of the drawings, the threaded portion of the finish of the final container has been compression formed by the blow tube 46 and the reduced end 70 thereof cooperating with the finish inserts 60. That portion of the tube which will ultimately form the lip or pouring edge of the container has been pre-formed to a convex shape by the sleeve 75 and the waste portion 79 of the container has been substantially severed from the container lip, but not completely severed therefrom.

Next, the blow air through the blow tube 46 is shut off, the mold sections 35, 36 are opened, and the mold sections are shifted from their position in FIG. 3 to their positions of FIG. 4. At this time, the blow tube 46 and the blown pre-form 50 carried thereby is positioned in the blow mold cavity 38, as illustrated in FIG. 9. The blow mold sections 36 are recessed at the neck region as described in connection with the pre-form molds 35 above and identical finish inserts 60 are carried by the blow mold sections 36.

However, different striker insert sections 80 are utilized. As best shown in FIG. 9, these striker insert sections 80 carried by the blow mold sections 36 are again generally semi-cylindrical in exterior configuration and are provided with a lower semi-cylindrical opening 81, registering with the openings 61 in the finish insert section 60. Upper, enlarged, concave opening 82 joins the opening 81 with an upper, substantially enlarged concave portion 83.

As above described, once the blow molds are closed onto the blown pre-form 50, the blow tube 46 is retracted and the blow tube 48 is introduced thereinto.

Figure 12:
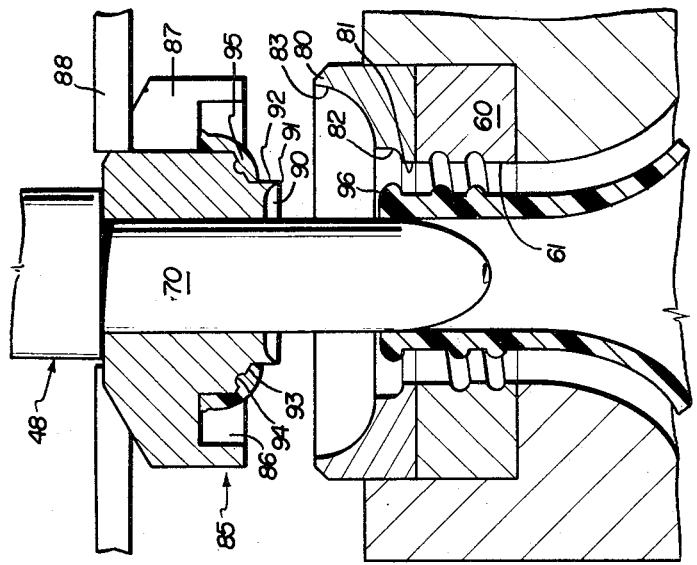
Figure 11:
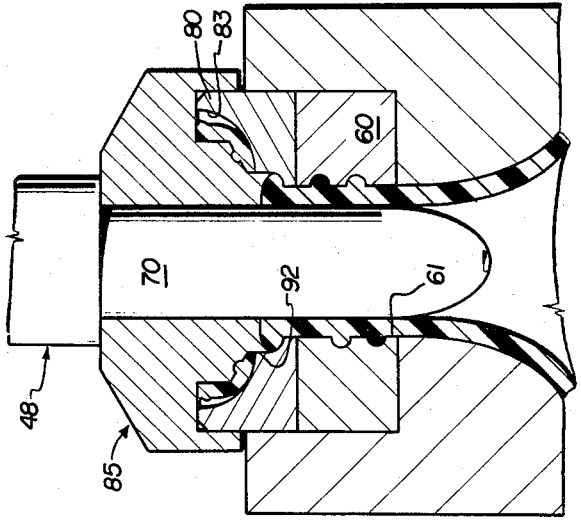
Figure 10:
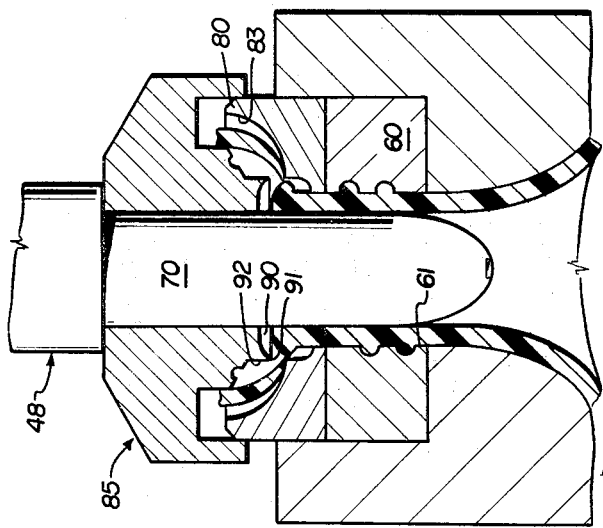

As best illustrated in FIGS. 10 through 12, the blow tube 48 is provided with the same lower, reduced extension 70 joined to the blow tube 48 by the radially outwardly extending shoulder 71. Encircling the reduced diameter extension 70 of the blow tube 48 is a cutting sleeve indicated generally at 85 (FIGS. 10–12). This cutting sleeve 85 is provided at its lower surface with an outer, upwardly extending recess 86 communicating with one or more vertical slots 87 into which project stripping fingers 88. The purpose of these slots 87 and fingers 88 will later be described.

The lower extremity of the cutting sleeve 85 is provided with a downwardly opening, concave recess 90 surrounded by a sharpened cutting edge 91 located between the recess of 90 and a cylindrical exterior conical wall 92 which mates closely with and slides axially into the recess 82 of the striker insert 80 heretofore described. A frustoconical wall 93 joins the wall 92 with the exterior recess 86 heretofore described, and this wall is interrupted by a locking groove 94.

Turning now to FIG. 10, it will be seen that the lower reduced projection 70 of the blow tube 48 enters the preform threaded neck which has been accurately positioned and retained in place by closure of the finish inserts 60 onto the neck. Next, the cutting sleeve 85 telescopes over the insert 80, and the recesses 90 and 82 cooperate to restrike or reform the previously formed extremity 77 of the bottle to the finally desired configuration of the pour lip 96. At the same time, the telescopic surfaces 92, 82 and the edge 91 severs from the remainder of the bottle those portions of the originally extruded tube lying beyond the pouring lip 96, these portions being indicated by reference numeral 95. The confining of this waste portion 95 between the surfaces 83 and 93 will force a portion of the material into the groove 94, thereby interlocking the severed material with the surface 93.

Upon retraction of the blow tube 48 from its position in FIG. 11 to its position of FIG. 12, the heretofore described stripper fingers 88 move into and through the slots displacing the waste portion from the surface 93. Generally the opening of the blow molds will release the finally formed bottle and the final retraction of the blown end extension 70 from the formed neck of the finished article will strip the article from the apparatus as has been described heretofore in connection with FIG. 5 of the drawings. Preferably, the stripping fingers 88 form a part of the stripper plate 47.

From the foregoing description, it will be appreciated that the two stage blowing of the extruded tube 22 carries with it several advantages. Not only is the tube conditioned, both dimensionally and thermally for the final blowing under conditions most conducive to orientation, but the finish of the bottle is pre-formed and the reformed to its final accurate shape and any flash or waste at the finish is eliminated. The resultant compression forming of the neck and threads, the accurate formation of the pouring lip, and the elimination of flash all take place during the pre-form blowing and the final blowing of the container and no extra time or manipulation is required to carry out these steps. As a consequence, the cycle time is not increased by the neck forming and flash severing operations.

What is claimed is:

1. In a method of making a blown thermoplastic article having enhanced physical characteristics due to molecular orientation of the article during its formation, successively (1) extruding a tubular parison, (2) blowing the tubular parison into a pre-form which more closely approximates the shape of said article than did the extruded tube and (3) blowing the pre-form into the configuration of the final article and cooling said pre-form intermediate steps (2) and (3) above to an average wall temperature conductive to molecular orientation during the performance of step (3), the improvement comprising the steps of simultaneously closing a pre-form blow mold onto the parison and closing a final blow mold on a previously blown pre-form, simultaneously moving the closed molds, carrying the parison and blown pre-form, from the orifice to a blowing location, carrying out step (2) above in the closed pre-form mold at said blowing location, carrying out step (3) above in the final mold at said blowing location, simultaneously opening both molds while supporting the blown pre-form at said blowing location independently of the molds, and jointly moving the two open molds toward the orifice to repeat the method.

2. In a method of making a container or the like of thermoplastic material, the steps of extruding a freely pendant tube from an annular orifice, enclosing the tube in a pre-form blow mold positioned at said orifice and having an interior cavity, separating the enclosed tube from the orifice, shifting said mold-enclosed tube from the orifice, inserting a first blow tube into the mold-enclosed tube, blowing the tube to the shape of the preform mold cavity, opening the pre-form mold while supporting the blown pre-form on the blow tube, enclosing the blown pre-form in a final blow mold having an interior cavity conforming to the shape of the container, withdrawing the first blow tube, moving the pre-form enclosed in the final blow mold to a second and different blowing location, inserting a second blow tube into the pre-form and blowing the pre-form to the shape of the final container.

3. In a method of making a blown container of thermoplastic material, the steps of extruding a freely pendant tube from an annular orifice spaced from separate pre-form blowing and final blowing stations, consecutively blowing said tube into a pre-form and into a final container in separate pre-form and final blow molds positioned at said stations, respectively, reciprocating said molds in fixed spaced relation on a common movable support located generally beneath said orifice, the reciprocation of said support relative to said orifice simultaneously (1) moving the pre-form mold and the final blow mold toward the orifice, and (2) moving the pre-form mold carrying the tube and the final blow mold carrying the pre-form to their respective pre-form blowing and final blowing stations, opening said molds simultaneously prior to movement (1) of said support, closing said molds simultaneously prior to movement (2) of said support, and supporting said blown pre-form independently of either of said molds whenever said molds are both opened to retain the pre-form in position to be enclosed by said final blow mold upon completion of movement (1) of said support.

4. In a method of making a blown article of thermoplastic material, the steps of extruding a tube, enclosing a portion of said tube in a pre-form blow mold while the tube is located at the extrusion location, separating the mold-enclosed tube portion from the orifice, transferring the mold-enclosed tube portion to a first blowing location, inserting a blow tube into said mold-enclosed tube portion, blowing the tube portion into a pre-form, opening the pre-form blow mold while supporting the pre-form on the blow tube, moving the pre-form mold back to the extrusion location, enclosing the blow tube-supported pre-form in a final blow mold, transferring the blown pre-form interiorly of the final blow mold to a second blowing location, blowing the pre-form interiorly of the final blow mold, opening the final blow mold to expose the final blown article, and returning the final blow mold to said first blowing location.

5. In a method of blow molding a thermoplastic article, the steps of extruding a freely pendant tubular parison at a parison location, the extrusion of said parison being performed while a previously extruded parison is enclosed in a pre-form mold at a pre-blowing location and while a previously formed pre-blown shape is enclosed in a final blow mold at a final blowing location, simultaneously blowing both said parison and said pre-form by inserting blow pipes therein, respectively, simultaneously opening said pre-blow mold and said final blow mold while retaining the pre-blown shape in position on said blow pipe at said pre-blow location, transferring the open pre-blow mold and final blow mold from their respective locations toward said parison, closing the pre-blow mold on said parison and closing the final blow mold on said pre-blown shape, withdrawing the blow pipe from said pre-blown shape, simultaneously moving the pre-blow mold and the enclosed parison and the final blow mold and the enclosed pre-blown shape to said pre-blow location and said final blowing location, respectively, and finally blowing said parison at said pre-blow location interiorly of said pre-blow mold to the pre-blown shape and blowing the pre-blown shape interiorly of the final blow mold to the final blown configuration.

6. In a method blowing a thermoplastic article, the steps of extruding a freely pendant tubular parison at a parison location, simultaneously with the extrusion of said parison performing the steps of (1) blowing a previously extruded parison at a pre-blowing location to a pre-blown shape and (2) blowing a previously formed pre-blown shape to a final blown configuration at a final blowing location, said steps (1) and (2) being performed in a pre-blow mold and a final blow mold, respectively, simultaneously opening said pre-blow mold and said final blow mold while retaining the pre-blown shape in position at said pre-blow location, transferring the open pre-blow mold and final blow mold from their respective locations toward said parison, closing the pre-blow mold on said parison and closing the final blow mold on said pre-blown shape, simultaneously moving the pre-blow mold and the enclosed parison and the final blow mold and the enclosed pre-blown shape to said pre-blow location and said final blowing location, respectively, and finally blowing said parison at said pre-blow location interiorly of said pre-blow mold to the pre-blown shape and blowing the pre-blown shape interiorly of the final blow mold to the final blown configuration.

7. In a method of blow molding a thermoplastic article, the steps of extruding a freely pendant tube from an annular orifice spaced from separate pre-form and final blow molds shiftable towards and away from the orifice, shifting the pre-form blow mold into alignment with said orifice while shifting the final blow mold toward the orifice, closing the pre-form blow mold on the tube while closing the final blow mold on a previously blown pre-form supported on a blow pipe in spaced relation to the orifice, withdrawing said blow pipe, shifting said mold-enclosed tube and said mold-enclosed pre-form from the orifice, inserting blow pipes into the mold-enclosed tube and the mold-enclosed pre-form, blowing the tube to the shape of a pre-form mold, blowing the pre-form to the shape of the final article, opening both molds while supporting the blown pre-form on a blow pipe, and shifting both blow molds toward the orifice to repeat the method.

References Cited

UNITED STATES PATENTS

| 3,325,862 | 6/1967 | Mehnert | 264—98 X |
| 3,081,489 | 3/1963 | Jackson et al. | 264—99 X |
| 2,715,751 | 8/1955 | Weber | 264—97 X |
| 3,224,038 | 12/1965 | Budesheim | 264—98 X |
| 3,032,809 | 5/1962 | Willard | 264—99 |

FOREIGN PATENTS

| 1,147,118 | 4/1969 | Great Britain | |
| 1,193,050 | 5/1970 | Great Britain | 264—96 |

ROBERT F. WHITE, Primary Examiner

J. H. SILBAUGH, Assistant Examiner

U.S. Cl. X.R.

264—98, 296; 425—Dig. 213, Dig. 215